April 6, 1943.  C. BRIDGES  2,315,929
METHOD FOR CLEANING HARD OR FROZEN BERRIES
Filed June 14, 1941  2 Sheets-Sheet 1
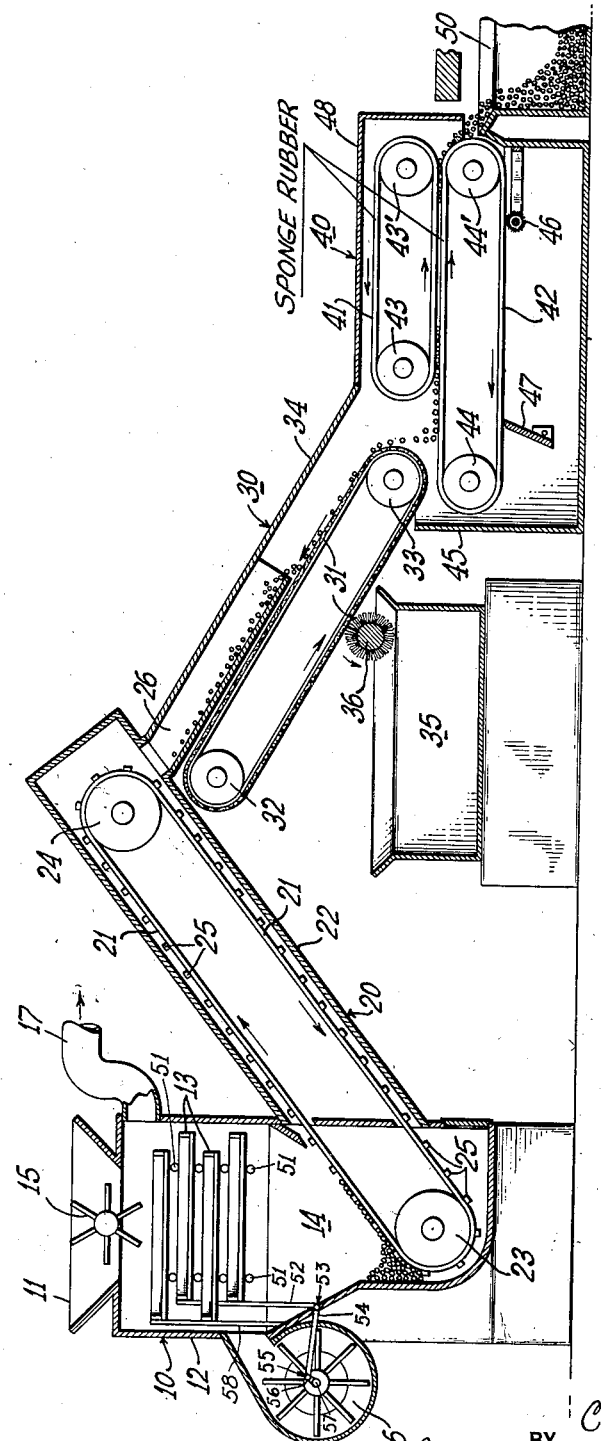
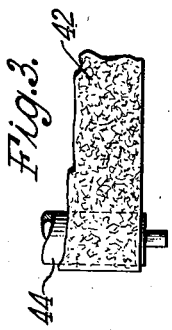
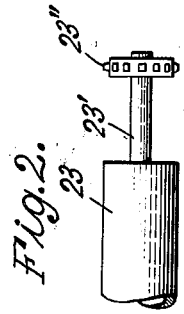
INVENTOR
Cole Bridges
BY
Watson, Bristol, Johnson & Leavenworth
ATTORNEYS April 6, 1943.   C. BRIDGES   2,315,929
METHOD FOR CLEANING HARD OR FROZEN BERRIES
Filed June 14, 1941   2 Sheets-Sheet 2
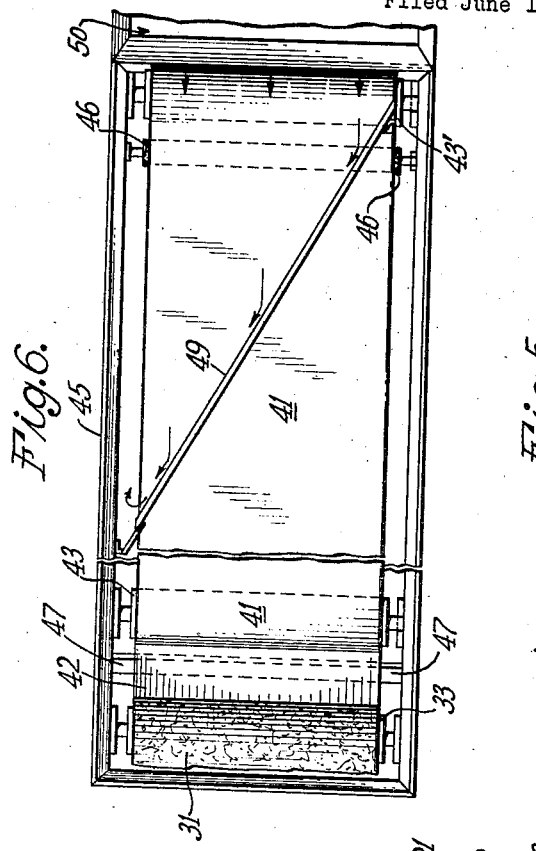
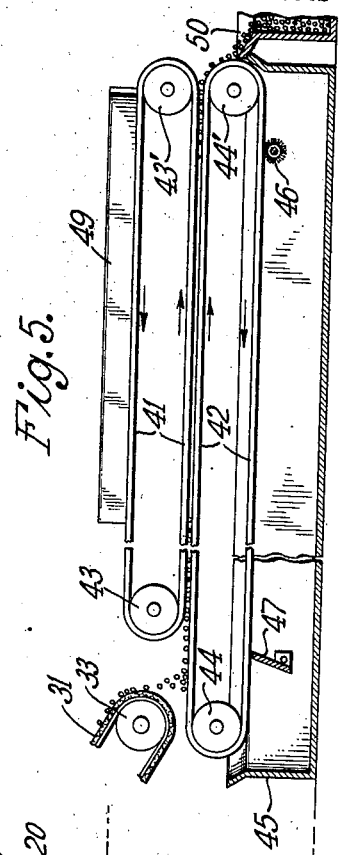
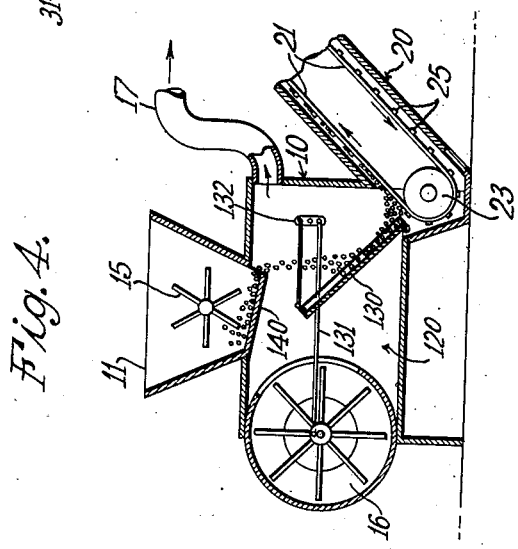
INVENTOR
Cole Bridges
BY Watson, Bristol, Johnson & Leavenworth
ATTORNEY Patented Apr. 6, 1943

2,315,929

UNITED STATES PATENT OFFICE 2,315,929

METHOD FOR CLEANING HARD OR FROZEN BERRIES

Cole Bridges, Calais, Maine

Application June 14, 1941, Serial No. 398,046

2 Claims. (Cl. 146—219)

This invention relates to a method for cleaning hard or frozen berries, and particularly to a method for cleaning frozen blueberries preparatory to packing for the market.

The invention has for its object generally the provision of both a method and an apparatus for effecting the cleaning of, and the removal of stems from, hard or frozen berries by the use of mechanical agents alone.

More particularly, the invention has for its object the provision of a set of procedural steps, together with suitable apparatus, for cleaning hard or frozen berries, particularly frozen blueberries, in a manner such that, when the berries are brought from the patch and frozen by suitable means, they may be then subjected to a series of mechanically performed steps which renders them substantially fully cleaned, and free of mud and stems, whereby the berries are made ready for immediate packing and shipping.

Still another object is to provide apparatus incorporating mechanical instrumentalities for effecting a novel series of operations on hard or frozen berries, which quickly and thoroughly cleans them and at the same time improves the keeping quality and flavor of the berries when they shall have reached the consumer.

Other objects of the invention will in part be obvious and will in part appear hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

For a fuller understanding of the nature and objects of the invention reference should be had to the following detailed description taken in connection with the accompanying drawings, in which:

Fig. 1 is a view, partly in vertical section and partly diagrammatic, showing an arrangement of apparatus comprising a group of cooperating units adapted for the practice of the invention;

Figs. 2 and 3 show fragmentary details of the apparatus illustrated in Fig. 1;

Fig. 4 shows, in vertical section, a modified form of shaker unit that may be substituted for that shown in the apparatus of Fig. 1;

Fig. 5 similarly shows a modified form of massaging unit that may be substituted for that shown in the apparatus of Fig. 1; and Fig. 6 shows a top plan view of the massaging unit shown in Fig. 5.

The berries to be cleaned by the method of the present invention are either initially hard, like cranberries, or are made hard by appropriate initial treatment such as freezing. Frozen huckleberries or blueberries are particularly adapted for treatment by the present invention. The cleaning here practiced comprises a combination of steps by which such berries, as brought from the patch, including adhering stems, mud, twigs and other refuse, after having been initially frozen, result in clustered aggregates of material which require cleaning before the berries can be packed or shipped. To break down such clusters, they are first beaten and then shaken, whereby the clusters become small parts, the individual berries being largely set free. The efficacy of this breaking-down step and freeing the berries may be enhanced by the application of a cross draft to blow away light particles of refuse.

When thus broken down, the resulting parts and individualized berries may be collected and delivered for cleaning, together with the separated mud, twigs, etc. which are still associated with the berries but not necessarily adhering thereto. This cleaning or separating step is best effected by the action of a napped surface on the aggregate, since the mud, twigs, etc. adhere to the nap and may be carried away while the berries roll off. Suitable means for practicing this step comprises an inclined continuous upwardly moving napped belt, onto the upper end of which the berries and associated matter are delivered. The upwardly moving nap carries up and away the loose matter associated with the berries, while the berries themselves roll downwardly in the opposite direction.

Since some stems may still adhere to the separated berries, another step of conditioning the berries is practiced, which may complete the cycle of steps practiced in the present invention. This conditioning step consists in applying an elastic wiping action to both upper and lower surfaces of the berries as delivered from the cleaning belt. In consequence, such stems as still adhere to the berries are broken off and the surfaces of the berries wiped off and made substantially clean. Such action may be likened unto "massaging." Suitable means for achieving this mechanically comprises a pair of endless sponge rubber belts so disposed as to receive the berries and apply the wiping or massaging action to the upper and lower surfaces of the berries.

An arrangement of apparatus for practicing such cycle of steps is illustrated in Fig. 1 and comprises four units, namely, a beater and shaker unit, a conveyor unit, a napped belt unit, and a massaging unit.

In Fig. 1, the beater and shaker unit is shown generally at 10, and comprises a hopper 11 arranged to feed into a chamber 12 which contains one or more trays 13, which are preferably vibrated (by structure hereinafter described) discharge into a cistern 14 whose walls taper inwardly at the sides so as to collect the material discharged from the trays 13 into a relatively small but deep space. Across the mouth of the hopper 11 is disposed a rotating breaker 15 which has radially disposed fingers that strike a succession of rapid blows on the clusters of frozen berry material that is deposited in the hopper 11 for cleaning. There is also preferably associated with the unit a blower 16 which may comprise a power-driven fan in a suitable casing that is arranged to discharge into chamber 12 and blow across the trays 13. An exit 17 is hence also preferably provided to convey away the material removed by this cross draft. The trays 13—13 may be mounted in any conventional manner for lateral reciprocation, such as by a plurality of horizontal rollers 51—51, or suspended by pivotally mounted arms, etc. The two sets of trays 13—13 shown in Fig. 1 may be vibrated by conventional structure such as by fixing to one set 13, 13 a vertical arm 52, pivoting it at 53 to an arm 54, and in turn pivoting the arm 54 at 55 to a crank arm 56 fixed to the shaft 57 of the blower 16. The other set of trays 13, 13 may be vibrated by similar structure including a vertical arm 58 fixed thereto and which corresponds to arm 52 of the other set. Obviously with the parts of the structure in the relative positions shown in Fig. 1, with the crank arm 56 extending substantially in the direction shown, the crank arm for the other set of trays will extend from the opposite end of shaft 57 substantially in the opposite direction.

The tray or trays 13 are shown as stationarily mounted in chamber 12 but, as pointed out above, are preferably arranged to be vibrated and have a periodic lateral motion. Such mounting for the tray or trays is seen to assist in effecting the breaking-down of the berry clusters to be practiced in this unit of the apparatus. The beater, the blower, and the tray or trays when vibrated are hence preferably arranged to be power driven. Any suitable means, such as a driven countershaft, a gas, steam, or electric motor, may be employed.

The second unit shown in Fig. 1 is indicated generally at 20, and comprises a conveyor device arranged for excavating the broken-down material from the cistern 14 and delivering the same to the third unit, here shown generally at 30. This conveyor unit comprises a conveyor belt 21 disposed in a housing or casing 22; the belt 21 being of the endless variety and passes around two rotatably mounted rollers or cylinders 23 and 24, either or both of which may be power driven to propel properly the belt 21. A fragment of the roller or cylinder 23 is shown in Fig. 2, where it is seen to have a journal portion 23' for mounting in a bearing and a gear or sprocket 23'' for receiving driving power. Belt 21 may, if desired, be provided with cleats or buckets 25 to expedite the removal and elevation of the broken-down material to be delivered to the unit 30.

Casing 22 has a chute 26 on its lower side adapted to project directly over the upper end of an endless belt in the next unit shown at 30. Such chute receives the discharge from the conveyor belt 21 so that the material, as it falls over the upper end of the conveyor belt, passes down to a suitable discharge point into unit 30.

Unit 30 is the separating and cleaning unit and employs for this purpose a napped endless belt 31 that is disposed in inclined position and has its top side moving upwardly. Any convenient napped fabric may be employed. A woolen napped or pile carpet is a suitable material. The napped belt 31 is passed about rotatably mounted rollers or cylinders 32 and 33, either one or both of which may be power driven. Opening 26 is so disposed as to deliver the broken-down material onto the napped surface of belt 31 at a point prior to the drop of the belt over the end at cylinder 32. The upper surface of the belt 31 is preferably protected by means of a baffle board 34 disposed over but spaced a desired distance from the belt 31.

From the above, it is seen that the material delivered onto the traveling napped surface from the opening 26 is immediately separated, the berries rolling down the incline, while mud, twigs, etc., adhere to the nap and move up and away from the berries and pass over the end of belt 31 and then fall into a receptacle 35 that is placed under the unit 30 to catch the refuse thus separated from the berries.

Very fine dirt and mud may, of course, penetrate into interstices of the nap on the belt 31. To remove this, the unit has a cleaning brush or beater 36 disposed to engage with the napped surface, preferably on the under side of the belt. The refuse receptacle 35 is accordingly so disposed as to collect the dirt removed by this brush or beater, although obviously a separate dirt collecting receptacle may be employed for this purpose.

The berries, which roll down and from the lower end of belt 31, i. e., over the end passing about cylinder 33, pass on or into the fourth unit, shown generally at 40, which effects the massaging step or operation on the berries from belt 31 whereby stems and tightly adhering dirt are removed; this operation completing the cycle of operations practiced in the cleaning method of the invention.

The massaging unit advantageously comprises a pair of preferably horizontally disposed endless belts 41 and 42 which have their adjacent surfaces traveling in the same direction. These belts are also disposed about power-driven cylinders 43 and 43', 44 and 44', respectively. The direction of motion of these adjacent surfaces of belts 41 and 42 is away from that of belt 31; the lower belt 42 being preferably extended out from under belt 41 toward belt 31, or otherwise arranged, so as to receive directly the berries from the lower end of belt 31.

The material of belts 41 and 42 is of a yieldable elastic material, soft enough to envelop substantially the upper and lower surfaces of the berries as they come from the belt 31. An elastic sponge rubber has been found to be a suitable material; the belts being from one-half to one inch in thickness. Such material gives the wiping action on the surfaces of the berries desired and sufficient agitation, by the elastic action of the sponge, to break off any stems or other matter still adhering to the berries. The nature of the belts 41 and 42 is generally illustrated in Fig. 3. A berry collecting receptacle or basket 50 is placed at the delivery end of the belts 41 and 42 to receive the berries from the massaging unit. Such unit has a base portion 45, preferably in the form of a receptacle which is adapted to collect the cleanings removed from the belt 42 by a brush 46, preferably of the rotary variety, which is disposed in the receptacle and adapted to contact the lower surface of the under portion of belt 42. The cleaning thus performed may be augmented by the provision of a scraper knife 47. The latter, it is seen, also is adapted for the removal of moisture that may adhere in the pores of the belt.

The massaging belts preferably have an upper enclosure 48 and are arranged to be adjustable both as to distance apart and tension. The distance apart for blueberries or huckleberries is, of course, relatively small and may be of the order of one-eighth inch, or nearly in contact. The width of these belts may be substantially any desired width; a width of from 20 to 30 inches is convenient. The length and speed may be only sufficient to give the desired massage by the expansion of the sponge. A length of from 3 to 8 feet is convenient; a speed of from 20 to 100 feet a minute being serviceable. In like manner, the length of belt 31 may be had from 20 to 30 feet, and it may run at a speed of about the same order as the sponge rubber belts. The conveyor unit is run at a speed which delivers the broken-down material at a desired rate.

In operation, the units are first set running, each being driven by suitable power means. The batches of berries, preferably frozen, are then put into the hopper 11. Here the clustered material in the batches is broken down and falls on the trays 13 where the parts are agitated by the shaking or vibrating action imparted to the tray. Here, the broken-down material is further divided, the individual berries being loosened and dropping with the accompanying mud, twigs, etc., into the cistern 14. From this latter the conveyor 20 excavates them, carrying them to an elevated point and delivering the same on the cleaning belt 31, which has the napped surface. Here, the dirt, twigs, stems, etc., are separated from the berries which roll down the inclined surface of belt 31 to be delivered to the final unit 40, while the dirt, twigs, stems, etc., are deposited in receptacle 35.

Belt 42 receives the berries from the lower end of belt 31 and carries them away to a point where they have their upper surfaces engaged by the belt 41. Between the elastic surfaces of these belts the berries are wiped, and any stems or other matter still adhering removed. The cleaned berries are then deposited in receptacle or basket 50. Dirt and stems finally removed are seen to fall into base 45, some which adhere being brushed off by brush 46, any still remaining being removed by scraper 47.

In the event that the cycle of steps or operations here indicated as practiced in the invention are deemed insufficient to effect the desired degree of cleaning of the berries, they may be run through the cleaning apparatus again, or the apparatus may be constructed to incorporate a second set of units. For example, a second conveyor may be disposed to take the berries from the first massaging unit, i. e., substituted for the receptacle or basket 50, and a second cleaning belt arranged to receive the berries delivered by the second conveyor, and a second massage unit arranged to receive the berries from the lower end of such second cleaning belt.

In the modified form of shaker unit shown in Fig. 4, there is but one tray 130 disposed to be in an inclined plane in chamber 120 of the unit, such unit having a hopper 11, as in the first form, and a breaker at 15. Here the fan blower 16 is shown provided with a connecting rod 131, connected to a linkage 132, by which the upper end of tray 130 is vibrated; the lower edge of the tray being pivoted to the casing of chamber 120. To provide a proper feed of berries from the hopper onto tray 130, a feed board 140 is disposed across the bottom of the hopper and positioned to feed the berries over one edge directly onto the vibrating tray 130. By this form of unit the tray vibrates with a varying amplitude, the berries initially striking portions moving with the greater amplitudes which helps the disintegration of clusters.

In the modification of the massage unit shown in Figs. 5 and 6, the upper belt 41 is shown provided with a large diagonally disposed scraper 49 which is arranged to clean the belt 41, removing any adhering dirt or twigs. This belt, however, is the more apt to convey moisture in its pores which may interfere with the massaging action. The use of a scraper, as shown at 49, is hence advantageous in increasing the efficiency of the unit. The diagonal arrangement is also advantageous in causing the moisture removed to drain off at one side.

Since certain changes in carrying out the above process and in the construction set forth, which embody the invention, may be made without departing from its scope, it is intended that all matter contained in the above description or shown in the accompanying drawings shall be interpreted as illustrative and not in a limiting sense.

Having described my invention, what I claim as new and desire to secure by Letters Patent is:

1. In a method of cleaning hard or frozen berries and the like, the procedure of freeing therefrom stems and foreign particles and wiping clean surfaces thereof by massaging the berries comprising, feeding the berries to between a pair of endless belts having opposed surfaces of readily yieldable material located apart a distance appreciably less than the mean diameter of the berries, and moving the opposed surfaces of the belts in the same direction to carry the berries therewith and at the same time to execute a wiping action on surfaces on opposite sides of the berries.

2. In a method of cleaning hard or frozen berries and the like, the procedure of freeing therefrom stems and foreign particles and wiping clean surfaces thereof by massaging both upper and lower surfaces of the berries comprising, feeding the berries to between a pair of endless belts having opposed substantially horizontally arranged surfaces of sponge rubber located a distance apart appreciably less than the mean diameter of the berries, and moving the opposed surfaces of the belts in the same direction to carry the berries therewith to a discharge location and at the same time to execute a wiping action on substantial areas of upper and lower surfaces of the berries by action of the sponge rubber thereon upon and during envelopment thereof and upon freeing the berries from envelopment by the sponge rubber at the discharge location.

COLE BRIDGES.